United States Patent
Kanatzidis et al.

(10) Patent No.: US 10,472,249 B2
(45) Date of Patent: Nov. 12, 2019

(54) AMORPHOUS AND POROUS ALKALI METAL CHALCOGENIDES FOR REMEDIATION APPLICATIONS

(71) Applicant: Northwestern University, Evanston, IL (US)

(72) Inventors: Mercouri G. Kanatzidis, Wilmette, IL (US); Zohreh Hassanzadeh Fard, Calgary (CA); Saiful M. Islam, Chicago, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 0 days.

(21) Appl. No.: 15/770,481

(22) PCT Filed: Nov. 1, 2016

(86) PCT No.: PCT/US2016/059856
§ 371 (c)(1),
(2) Date: Apr. 23, 2018

(87) PCT Pub. No.: WO2017/079129
PCT Pub. Date: May 11, 2017

(65) Prior Publication Data
US 2019/0055136 A1    Feb. 21, 2019

Related U.S. Application Data

(60) Provisional application No. 62/249,581, filed on Nov. 2, 2015.

(51) Int. Cl.
*B01J 39/02* (2006.01)
*B01J 39/09* (2017.01)
(Continued)

(52) U.S. Cl.
CPC ............ *C01G 30/002* (2013.01); *B01J 39/02* (2013.01); *B01J 39/09* (2017.01); *C02F 1/281* (2013.01);
(Continued)

(58) Field of Classification Search
CPC ......... B01J 39/02; B01J 39/09; C01G 30/002; C01G 30/008; C01G 19/006; C02F 1/281;
(Continued)

(56) References Cited

U.S. PATENT DOCUMENTS 4,040,917 A    8/1977   Whittingham
4,159,962 A    7/1979   Di Salvo, Jr. et al.
(Continued)

FOREIGN PATENT DOCUMENTS

WO    WO2009048552    4/2009

OTHER PUBLICATIONS

International Search Report and Written Opinion mailed in PCT/US2016/059856, dated Jan. 24, 2017.
(Continued)

*Primary Examiner* — Timothy C Vanoy
(74) *Attorney, Agent, or Firm* — Bell & Manninng, LLC

(57) ABSTRACT

Amorphous metal chalcogenides having the formula $A_{2x}Sn_xSb_{3-x}Q_6$ are provided. In the chalcogenides, A is an alkali metal element, such as K or Cs, and Q is S or Se. The value of x can be in the range from 0.8 to 1. Porous chalcogenide materials made from the amorphous chalcogenides are also provided. These porous materials comprise metal chalcogenides having the formula $(AB)_{2x}Sn_xSb_{3-x}Q_6$, wherein x is in the range from 0.8 to 1, A and B are two different alkali metal elements, and Q is S or Se.

21 Claims, 8 Drawing Sheets

(51) Int. Cl.
*C02F 1/42* (2006.01)
*C01G 30/00* (2006.01)
*C09C 1/00* (2006.01)
*C09C 1/30* (2006.01)
*C02F 1/28* (2006.01)
*C02F 101/00* (2006.01)
*C02F 101/20* (2006.01)

(52) U.S. Cl.
CPC ................ *C02F 1/42* (2013.01); *C09C 1/00* (2013.01); *C09C 1/30* (2013.01); *C01P 2002/72* (2013.01); *C01P 2002/82* (2013.01); *C01P 2002/84* (2013.01); *C01P 2002/85* (2013.01); *C01P 2004/03* (2013.01); *C01P 2004/82* (2013.01); *C01P 2006/12* (2013.01); *C01P 2006/16* (2013.01); *C02F 2001/425* (2013.01); *C02F 2101/006* (2013.01); *C02F 2101/20* (2013.01)

(58) Field of Classification Search
CPC .. C02F 2101/006; C02F 2101/20; C02F 1/42; C01P 2002/72; C01P 2002/85; C01P 2004/03; C01P 2004/82; C01P 2006/12; C01P 2006/16; C01P 2002/84; C01P 2002/82; B01D 53/64
See application file for complete search history.

(56) References Cited

U.S. PATENT DOCUMENTS

| | | | |
|---|---|---|---|
| 4,665,039 A | 5/1987 | Kokubu et al. | |
| 5,531,936 A | 7/1996 | Kanatzidis et al. | |
| 6,013,204 A | 1/2000 | Kanatzidis et al. | |
| 8,070,959 B2 | 12/2011 | Kanatzidis et al. | |
| 8,519,347 B2 | 8/2013 | Kanatzidis et al. | |
| 9,056,263 B2* | 6/2015 | Kanatzidis | B01D 15/02 |
| 9,227,186 B2 | 1/2016 | Kanatzidis et al. | |
| 10,141,573 B2* | 11/2018 | Mukai | H01M 4/5815 |
| 2009/0095684 A1 | 4/2009 | Kanatzidis et al. | |
| 2011/0290735 A1* | 12/2011 | Kanatzidis | B01D 15/02 |
| | | | 210/681 |
| 2014/0097141 A1 | 4/2014 | Kanatzidis et al. | |

OTHER PUBLICATIONS

Fard et al., Porous Amorphous Chalcogenides as Selective Adsorbents for Heavy Metals, Chemistry of Materials, Sep. 3, 2015, pp. 6189-6192.

Arachchige et al., Mercouri G. Kanatzidis: Excellence and Innovations in Inorganic and Solid-State Chemistry, Inorg. Chem., 56, Jun. 27, 2017, pp. 7582-7597.

* cited by examiner

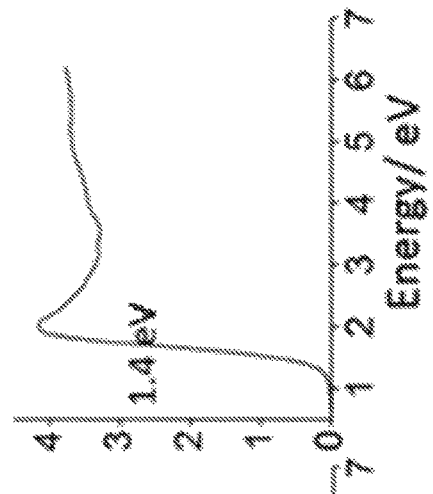
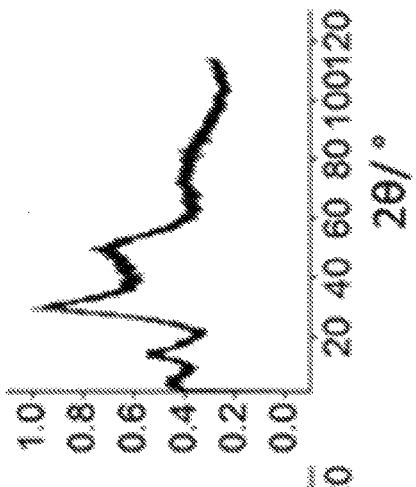
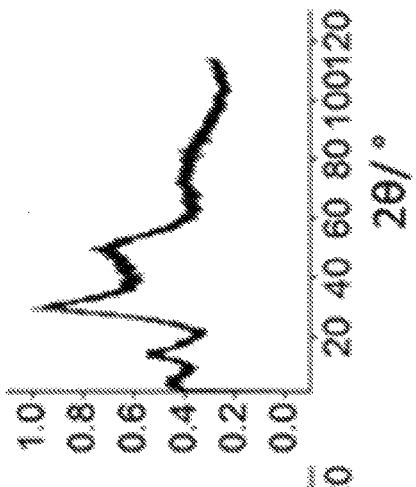
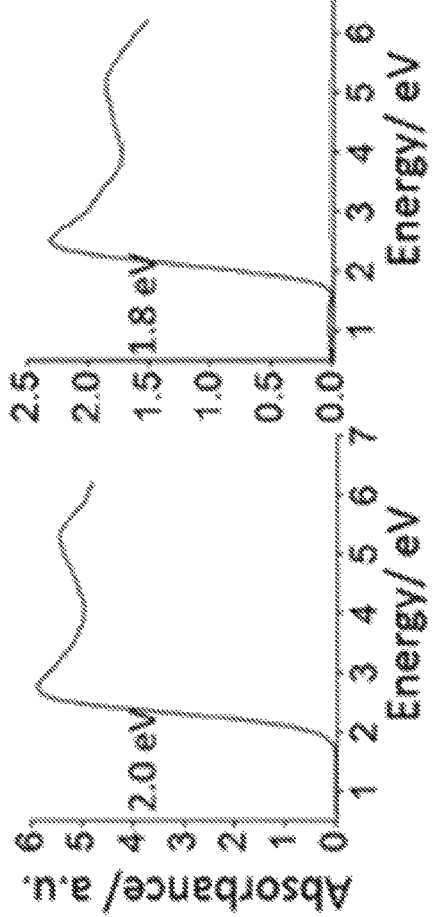
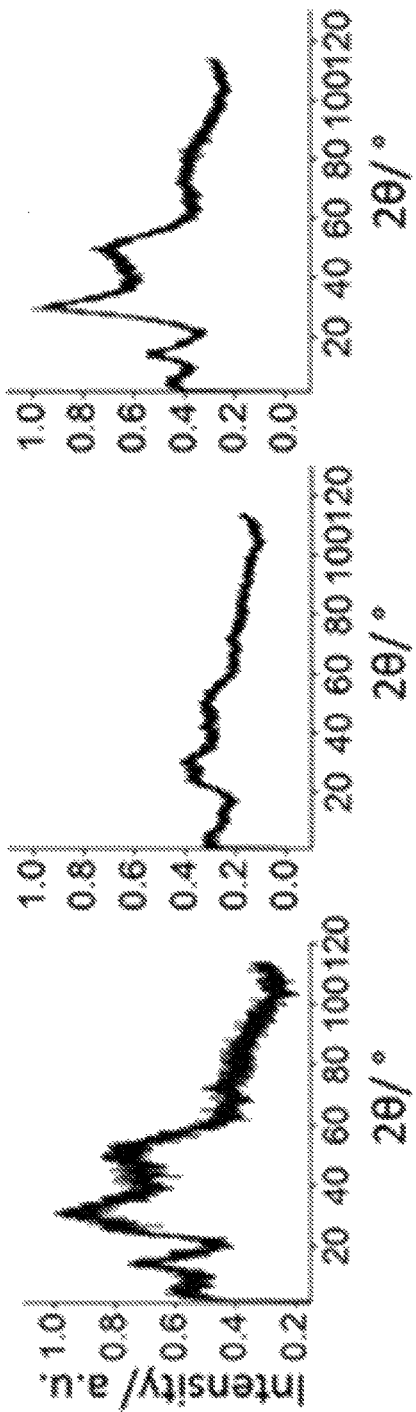

US 10,472,249 B2

AMORPHOUS AND POROUS ALKALI METAL CHALCOGENIDES FOR REMEDIATION APPLICATIONS

CROSS-REFERENCE TO RELATED APPLICATIONS

The present application is a National Stage Entry of International Application No. PCT/US2016/059856 that was filed on Nov. 1, 2016, the entire contents of which are hereby incorporated by reference, which claims priority to U.S. provisional patent application No. 62/249,581 that was filed on Nov. 2, 2015, the entire contents of which are hereby incorporated by reference.

BACKGROUND

Amorphous chalcogenides are of great interest for various optical and photonic applications because of their transparency in the second atmospheric window from 8 to 14 μm. They have been studied mostly for application as passive devices such as lenses, windows, and fibers. Chalcogenide glasses that are doped with ions of rare-earth elements also enable active devices such as laser fiber amplifiers and nonlinear optical components.

SUMMARY

Amorphous metal chalcogenides, porous materials comprising metal chalcogenides, methods of making the porous materials, and methods of using the porous materials in remediation applications are provided.

The amorphous metal chalcogenides include porous and non-porous amorphous alkali metal chalcogenides having the formula $A_{2x}Sn_xSb_{3-x}Q_6$, wherein x is in the range from 0.8 to 1, A is an alkali metal element, and Q is S or Se. In some embodiments of these metal chalcogenides, A is potassium or cesium.

The porous materials comprise a chalcogenide having the formula $A_{x'}M_yM'_zQ_m$, where A is an alkali metal element or a mixture of two or more alkali metal elements; M and M' are main group metal elements or elements from groups 14 or 15 of the periodic table of the elements; Q is S, Se or Te; x', y, and z are independently selected from values in the range from 0 to 10 (for example, from 0.5 to 10), and m is in the range from 1 to 20.

Some embodiments of the chalcogenides have the formula $(AB)_{2x}Sn_xSb_{3-x}Q_6$, wherein x is in the range from 0.8 to 1, A and B are two different alkali metal elements, and Q is S or Se. In some embodiments of the porous materials, A is potassium or cesium and B is lithium, sodium or potassium.

The porous materials can be used to remove metal ions from a sample containing the metal ions by: exposing the sample comprising metal ions to a porous material of the type described herein, whereby the metal ions undergo ion exchange with cations of the chalcogenide; and removing the porous material from the sample.

The porous materials can be synthesized by: mixing an amorphous metal chalcogenide having the formula $A_{x'}M_yM'_zQ_m$, where A is an alkali metal element; M and M' are main group metal elements or elements from groups 14 or 15 of the periodic table of the elements; Q is S, Se or Te; x', y, and z are independently selected from values in the range from 0 to 10, and m is in the range from 1 to 20, with an inorganic halide salt having the formula BX, where X is a halogen and B is an alkali metal element, and further wherein A and B may be the same element or different elements; melting the amorphous metal chalcogenide and the inorganic halide salt to form a homogeneous molten mixture; solidifying the molten mixture to form a composite material comprising particles of a first phase comprising an inorganic halide salt in a matrix of a second phase comprising an amorphous metal chalcogenide having the formula $A_{x'}M_yM'_zQ_m$; and extracting the first phase from the composite material to form the pores.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3A shows the ultraviolet/visible/near infrared (UV/Vis/NIR) absorption spectrum for $K_2SnSb_2S_6$. FIG. 3B shows the powder x-ray diffraction (PXRD) pattern for $K_2SnSb_2S_6$. FIG. 3C shows the UV/Vis/NIR absorption spectrum for $Cs_2SnSb_2S_6$. FIG. 3D shows the PXRD pattern for $Cs_2SnSb_2S_6$. FIG. 3E-shows the UV/Vis/NIR absorption spectrum for $K_2SnSb_2Se_6$. FIG. 3F shows the PXRD pattern for $K_2SnSb_2Se_6$.

DETAILED DESCRIPTION

Figure 1:
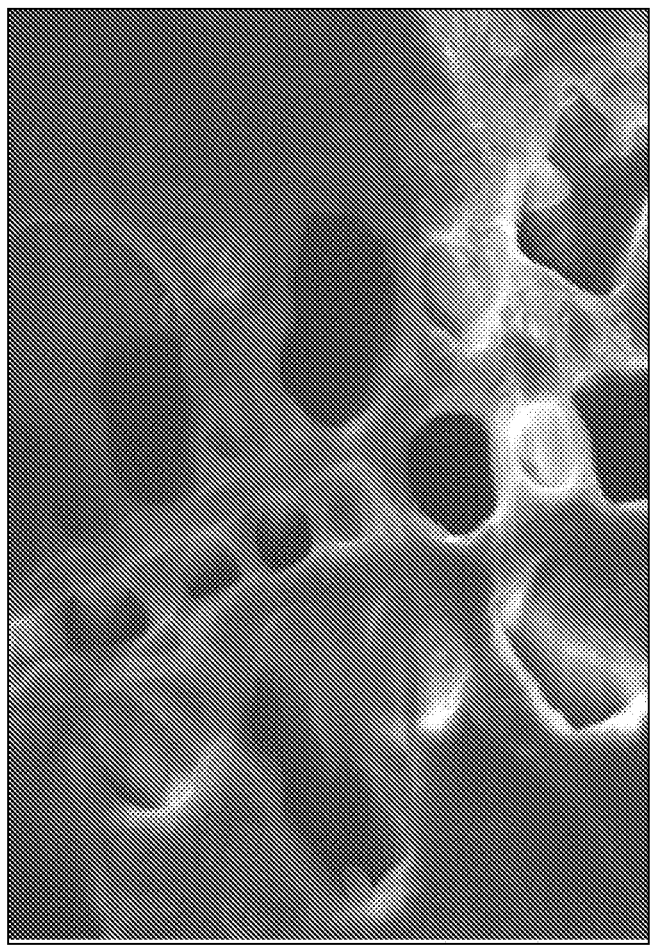
FIG. 1 shows a scanning electron microscope (SEM) image of $K_2S_2O_3$ after soaking in water.

Amorphous metal chalcogenides having the formula $A_{2x}Sn_xSb_{3-x}Q_6$ are provided. In the chalcogenides, A is an alkali metal element, such as K or Cs, and Q is S or Se. The value of x can be in the range from 0.8 to 1.

Porous materials made from amorphous chalcogenides are also provided. These porous materials comprise metal chalcogenides having the formula $A_{x'}M_yM'_zQ_m$, where A is an alkali metal element or a mixture of two or more alkali metal elements; M and M' are main group metal elements or elements from groups 14 or 15 of the periodic table of the elements; Q is S, Se or Te; x', y, and z are independently selected from values in the range from 0 to 10, and m is in the range from 1 to 20. Methods of using the porous materials in remediation applications and methods for making the porous materials are also provided.

Some embodiments of the porous materials have the formula $(AB)_{2x}Sn_xSb_{3-x}Q_6$, wherein x is in the range from 0.8 to 1, A and B are the same or different alkali metal elements, and Q is S or Se.

The porous chalcogenide materials are characterized by high surface areas and are well-suited for use in removing metal ions, including transition metal ions, alkaline earth metal ions and metalloids, from liquid-phase and gas-phase samples via cation exchange reactions. By way of illustration, some embodiments of the porous materials have surface areas in the range from 10 m²/g to 300 m²/g, as measured by Brunauer-Emmett-Teller (BET).

Examples of metal ions that can be removed from a sample include transition metal ions, such as mercury, lead, or cadmium ion. Other examples are silver, cobalt, nickel, copper, thallium, platinum, arsenic, cesium, strontium, and uranium ions. Among the ions that can be removed are radioactive ions and heavy metal ions. As a result, the porous chalcogenide materials are useful as cation exchange materials for the removal of unwanted metal ions from waste water, such as waste water from commercial and industrial sources, including municipal waste water treatment plants, mining operations, nuclear power plants and plants for making electric lamps, gauges, batteries, chemicals and paper. In addition, the materials can be used to remove undesirable metal ions from drinking water supplies and natural bodies of water. Other applications for the ion exchange materials include capturing off-gas iodine during nuclear waste remediation and capturing Hg vapors from natural gas, crude oil and the burning of coal. In addition, the materials have applications in electronic and optical semiconductor devices.

The porous materials are melt-processable, as illustrated in the Example. Thus, they can be formed into objects having a vast variety of shapes, sizes, and textures. In some embodiments, the porous materials are formed into particles for filters or ion-exchange columns, wherein the particles are sufficiently large to avoid either passing through the filters or clogging the columns.

In one embodiment of a method for remediating a sample using the porous chalcogenides, a sample containing unwanted metal ions is exposed to the porous materials, whereby cations on the chalcogenide undergo ion exchange with the metal ions. The porous material, along with the exchanged metal ions, can then be removed from the sample. The porous materials can be supported by a substrate, such as a mesh, for use as a filter, or can be packed into a column, for use as an ion exchange column.

The amorphous chalcogenides having the formula $A_{2x}Sn_xSb_{3-x}Q_6$ may be synthesized via three schemes. In the first scheme, an alkali-metal carbonate ($A_2CO_3$) can be reacted with elemental sulfur (or selenium), tin and antimony to produce the amorphous chalcogenide, along with $A_2S_2O_3$ and $CO_2$ byproducts. Alternatively, an alkali metal sulfide (or alkali metal selenide) can be reacted with elemental sulfur (or selenium), tin and antimony to produce the amorphous chalcogenide. In a third variation, the amorphous chalcogenides are synthesized by reacting an alkali metal sulfide (or alkali metal selenide) with elemental sulfur (or selenium), elemental tin, and antimony trisulfide (or antimony triselenide) to produce the amorphous chalcogenide. The synthesis of the amorphous chalcogenides can be carried out at low temperatures, including temperatures of 1000° C. or lower. For example, the synthesis can be carried out at temperatures in the range from 750° C. to 850° C.

Figure 2B:
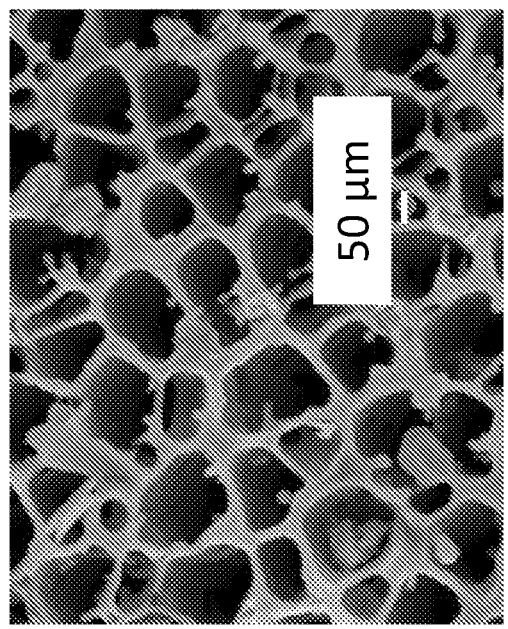
FIG. 2B is an SEM image of a porous chalcogenide.
Figure 2A:
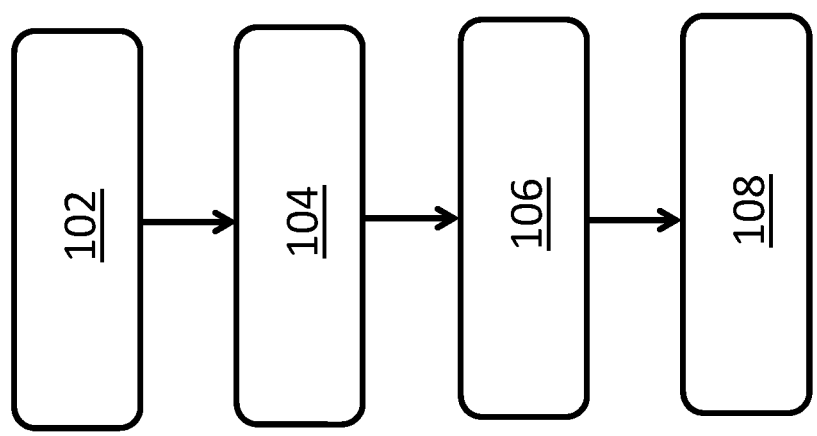
FIG. 2A is a flowchart showing the steps for preparing an amorphous porous chalcogenide.

The amorphous chalcogenides can be used as the starting materials for the synthesis of the porous chalcogenide materials. A detailed description of a method for synthesizing porous chalcogenides in provided in the Example. The flowchart in FIG. 2A illustrates the process. Briefly, the methods entail forming a mixture of the amorphous alkali metal chalcogenide having the formula $A_xM_yM'_zQ_m$, with a water-soluble salt 102, such as an inorganic alkali metal halide salt having the formula, BX, wherein B is an alkali metal element that is the same as, or different from, the alkali metal of the amorphous alkali metal chalcogenide starting material and X is a halogen. The mixture is then melted to form a homogeneous molten mixture 104. The molten mixture has the formula $(BX)_n(A_xM_yM'_zQ_m)_h$, where A, B, X, M, M', Q, x', y, z, and m are defined above and n and h have values in the range from 1 to 4. This mixture is then quenched via rapid cooling 106 to form a solid composite material comprising particles of a first phase comprising the inorganic halide salt in a matrix of a second phase comprising the amorphous alkali metal chalcogenide. Finally, the second phase is selectively removed 108 by, for example, dissolution to leave a porous chalcogenide material comprising chalcogenides having the formula $A_xM_yM'_zQ_m$. The pores formed in the chalcogenide matrix by the removal of the second phase include micropores having pore sizes in the range from 1 μm to a 200 μm, or even larger, as determined by scanning electron microscope analysis. For example, embodiments of the porous material will include at least some pores having sizes of 50 μm or larger, as shown in the SEM image of FIG. 2B. The chalcogenide matrix can, in addition, define a set of smaller pores, including pores having sizes in the range from 2 nm to 500 nm.

In some embodiments of these methods, the amorphous chalcogenide starting material has the formula $A_{2x}Sn_xSb_{3-x}Q_6$, the inorganic halide salt has the formula BX, where B and A are different alkali metal elements, and the porous chalcogenide has the formula $(AB)_{2x}Sn_xSb_{3-x}Q_6$. In these embodiments, some of the B element can be retained in the final porous chalcogenide due to ion-exchange.

EXAMPLE

This example describes the amorphous chalcogenides of $A_{2x}Sn_xSb_{3-x}Q_6$ (A=K, Cs; Q=S, Se; x=0.8-1) and a facile process to create porous versions thereof. Specifically the porous amorphous materials are formed by flame melting/ water quenching mixtures of the chalcogenide and inert inorganic salts followed by exsolution of the salts. The resulting materials have a broad range of pore sizes, surface areas of 15-50 m²/g and bandgaps ranging from 1.40 to 2.0 eV. The porous versions of $K_2SnSb_2S_6$ and $Cs_2SnSb_2S_6$ exhibit rapid and effective ion exchange properties and remove ~99.9% of mercury from aqueous solutions and thus can be efficiently used for waste water purification.

Three chalcogenides are described with the nominal compositions of $K_2SnSb_2S_6$ (1), $Cs_2SnSb_2S_6$ (2), and $K_2SnSb_2Se_6$ (3) featuring amorphous structures. Alkali-metal carbonates and sulfur can provide an in situ, useful polysulfide flux.[3] A general equation for this reaction in which alkali metal polysulfides ($A_2S_x$) are produced along with $A_2S_2O_3$ and $CO_2$ byproducts is given in Eq. 1. (Kanatzidis, M. G., Molten alkali-metal polychalcogenides as reagents and solvents for the synthesis of new chalcogenide materials. *Chem. Mater.* 1990, 2, 353; Gobeltz, N.; Demortier, A.; Lelieur, J. P., Identification of the Products of the Reaction between Sulfur and Sodium Carbonate. *Inorg. Chem.* 1998, 37, 136). The title compounds can be synthesized according to equations 2 and 3, below.

$$3A_2CO_3+(2x+2)S \rightarrow 2A_2S_x+A_2S_2O_3+3CO_2 \qquad \text{Eq. 1}$$

$$3A_2CO_3+14S+2Sn+4Sb \rightarrow 2A_2SnSb_2S_6+A_2S_2O_3+3CO_2 \qquad \text{Eq. 2}$$

(A=K, 1; Cs, 2)

$$A_2Q+5Q+Sn+2Sb \rightarrow A_2SnSb_2Q_6 \qquad \text{Eq. 3}$$

(A=K, 1 and 3; Cs, 2; Q=S, 1 and 2; Se, 3)

Compound 1 was synthesized using three different methods. In method (a), $K_2CO_3$ (0.03 mol, 4.146 g), Sn (0.03 mol, 3.561 g), Sb (0.06 mol, 7.306 g) and S (0.19 mol, 6.092 g) were combined and loaded in a 50 mL grinding jar under nitrogen atmosphere in a glove box. The mixture was ball-milled at 100 rpm for 1 min and at 250 rpm for 30 minutes. 3 g of the ball-milled mixture was placed in a 13 mm outer diameter (OD) carbon coated fused-silica tube under $N_2$ atmosphere. A rubber balloon was attached at the end of the reaction tube in order to accommodate the created pressure of the $CO_2$ evolution. The mixture was heated gradually to 200° C. where it was kept for 5 h before being successfully brought to 800° C. It was kept at 800° C. for 8 h. A red glassy ingot was obtained by cooling at a rate of 40° C./h to room temperature. In method (b), A mixture of $K_2S$ (4 mmol, 0.4410 g), S (8 mmol, 0.2565 g), Sn (4 mmol, 0.4570 g), and $Sb_2S_3$ (4 mmol, 1.3588 g) was sealed under vacuum ($10^{-4}$ Torr) in a 13 mm (OD) carbon coated fused-silica tube and heated (80° C./h) to 800° C. It was kept there for 24 h, followed by cooling to room temperature at 40° C./h. In method (c), compound 1 was also synthesized by combining in a nitrogen-filled glovebox $K_2S$ (2 mmol, 0.2205 g), S (10 mmol, 0.3206 g), Sn (2 mmol, 0.2347 g), and Sb (4 mmol, 0.4870 g) with the same type of silica reaction vessel flame-sealed under vacuum, and same temperature profile as method b. The empirical formula for the products obtained from three methods was $K_2SnSb_2S_6$ based on EDS analyses. The product was a red ingot.

Compound 2 was synthesized with two different methods. In method (a), $Cs_2S$ (1 mmol, 0.2205 g), S (5 mmol, 0.1620 g), Sn (1 mmol, 0.1187 g), and Sb (2 mmol, 0.2435 g) were used in accordance to the conditions and heating profile for the synthesis compound 1. In method (b), $Cs_2CO_3$ (0.03 mol, 9.775 g), Sn (0.03 mol, 3.561 g), Sb (0.06 mol, 7.306 g) and S (0.19 mol, 6.092 g) were combined and loaded in a 50 mL grinding jar under nitrogen atmosphere in a glove box. The mixture was ball-milled at 100 rpm for 1 min and at 250 rpm for 30 minutes. 3 g of the ball-milled mixture was placed in a 13 mm (OD) carbon coated fused-silica tube under $N_2$ atmosphere. A secured balloon was attached at the end of the reaction tube in order to absorb the created pressure of the $CO_2$ evolution. The mixture was heated gradually to 200° C. where it was kept for 5 h before being raised to 800° C. and kept for 8 h. An orange glassy ingot was obtained by cooling at a rate of 80° C./h to room temperature. For the synthesis of compound 3, a mixture of $K_2Se$ (2 mmol, 0.3143 g), Se (10 mmol, 0.7896 g), Sn (2 mmol, 0.2347 g), and Sb (4 mmol, 0.4870 g) was sealed under vacuum ($10^{-4}$ Torr) in a 13 mm (OD) carbon coated fused-silica tube and heated (80° C./h) to 800° C. for 24 h, followed by cooling to room temperature at 40° C./h. The product was a dark red-black ingot.

The $K_2S_2O_3$ byproduct (detected in powder X-ray diffraction patterns of the products) can then be washed away by soaking the product in water. The scanning electron microscopy (SEM) image of the product after soaking in water showed macroporosity (FIG. 1). This observation and the following three reasons motivated the making of porous glasses of 1 and 2 and their testing as selective heavy metal ion adsorbents. First, sulfide based materials have very high affinity for soft Lewis acid ions, as has been shown in previous reports for crystalline $A_{2x}M_xSn_{3-x}S_6$ (A=alkali metal; M=Mn, Mg; x=0.5-0.95; KMS-1 and KMS-2, respectively) (Manos, M. J.; Kanatzidis, M. G., Sequestration of Heavy Metals from Water with Layered Metal Sulfides. Chem. Eur. J. 2009, 15, 4779; Manos, M. J.; Kanatzidis, M. G., Highly Efficient and Rapid $Cs^+$ Uptake by the Layered Metal Sulfide $K_{2x}Mn_xSn_{3-x}S_6$ (KMS-1). J. Am. Chem. Soc. 2009, 131, 6599; Manos, M. J.; Ding, N.; Kanatzidis, M. G., Layered metal sulfides: Exceptionally selective agents for radioactive strontium removal. Proc. Nat. Acad. Sci. 2008, 105, 3696; Mertz, J. L.; Hassanzadeh Fard, Z.; Malliakas, C. D.; Manos, M. J.; Kanatzidis, M. G., Selective Removal of $Cs^+$, $Sr^{2+}$, and $Ni^{2+}$ by $K_{2x}Mg_xSn_{3-x}S_6$ (x=0.5-1) (KMS-2) Relevant to Nuclear Waste Remediation. Chem. Mater. 2013, 25, 2116; Hassanzadeh Fard, Z.; Malliakas, C. D.; Mertz, J. L.; Kanatzidis, M. G., Direct Extraction of $Ag^+$ and $Hg^{2+}$ from Cyanide Complexes and Mode of Binding by the Layered $K_2MgSn_2S_6$ (KMS-2). Chem. Mater. 2015, 27, 1925). In principle, chalcogenides are superior as heavy metal ion absorbents over any other classes of materials. Second, the glasses reported here can be made in almost any user defined shape and texture because they are melt processable. This property is attractive in ion-exchange column applications where the use of small submicron particle sizes is inappropriate. For example, particles that are too small can often pass through filters (in batch method ion-exchange processes) thus hindering remediation efforts by allowing the solids into the effluent. Furthermore, small particles can cause clogging of columns. Third, compounds 1 and 2 show high thermal stability and are stable in air and water. Ion-exchange ability was not investigated for compound 3 because of air and moisture sensitivity.

The porous amorphous chalcogenides of compounds 1 and 2 were synthesized by adding inert soluble inorganic salts into the pre-synthesized compounds, flame melting/water quenching of the mixture and finally liquid extraction of the salt (FIG. 2A). More specifically, pre-synthesized $A_{2x}Sn_xSb_{3-x}S_6$ (A=K, Cs) and soluble inorganic salts (e.g., NaI, KI, or other halide salt, at different volume fractions) were mixed inside a silica tube and flame melted under flow of nitrogen. When a congruent melt was observed it was then quenched in room temperature water. The product was then soaked in water and then in ethanol for 24 hour to completely dissolve the halide salts. The product was then washed with water and acetone and dried under vacuum overnight. EDS analyses were used to confirm the total removal of the halide salts. It is important that a homogenous liquid be achieved during melting. As the temperature drops upon quenching solidifying the system, the two phases segregate via a phase separation process.

UV-vis/near-IR (NIR) spectroscopy indicates a room temperature band gap of 2.0 eV for 1, 1.8 eV for 2, and 1.4 eV for 3, which are in accordance with their colors. FIG. 3(A) shows the UV/Vis/NIR absorption spectrum for $K_2SnSb_2S_6$. FIG. 3(C) shows the UV/Vis/NIR absorption spectrum for $Cs_2SnSb_2S_6$. FIG. 3(E) shows the UV/Vis/NIR absorption spectrum for $K_2SnSb_2Se_6$. The powder X-ray diffraction (PXRD) patterns of all three compounds confirmed their amorphous nature. FIG. 3(B) shows the PXRD pattern for $K_2SnSb_2S_6$. FIG. 3(D) shows the PXRD pattern for $Cs_2SnSb_2S_6$. FIG. 3(F) shows the PXRD pattern for $K_2SnSb_2Se_6$. The composition and chemical stability of $A_2SnSb_2S_6$ (A=K and Cs) were confirmed by energy dispersive microprobe spectroscopy (EDS) and X-ray photoelectron spectroscopy (XPS).

Thermal properties of the materials were studied with differential thermal analysis (DTA). The thermograms showed that compounds 1 and 2 are not phase-change materials (i.e., they don't crystallize) and preserve their amorphous structures upon heating. Compound 3 crystallizes at 305° C. to give $K_4Sn_3Se_8$ as determined with PXRD.

The amorphous $K_2SnSb_2S_6$ and $Cs_2SnSb_2S_6$ phases present an intimate combination of strong covalent bonding (i.e.

Figure 4:
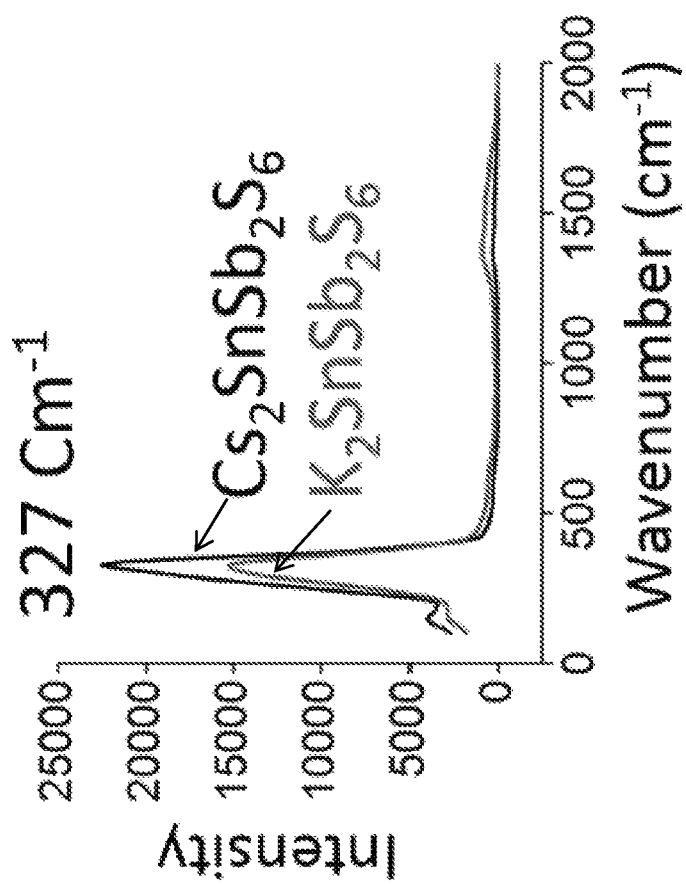
FIG. 4 shows the Raman scattering spectra of $K_2SnSb_2S_6$ and $Cs_2SnSb_2S_6$ at room temperature (~23° C.).

Sb/Sn—S bonds) and weak ionic K . . . S bonding in the structure. Presumably, this mixed bonding represents a type of balance in the structure that frustrates the system's ability to crystallize when cooled rapidly from the melt. Raman spectra of both phases showed a characteristic similar peak at ~327 cm$^{-1}$ which can be attributed to vibrations involving only the [SnSb$_2$S$_6$]$^{2-}$ framework (FIG. 4).

Figures 5A, 5B:
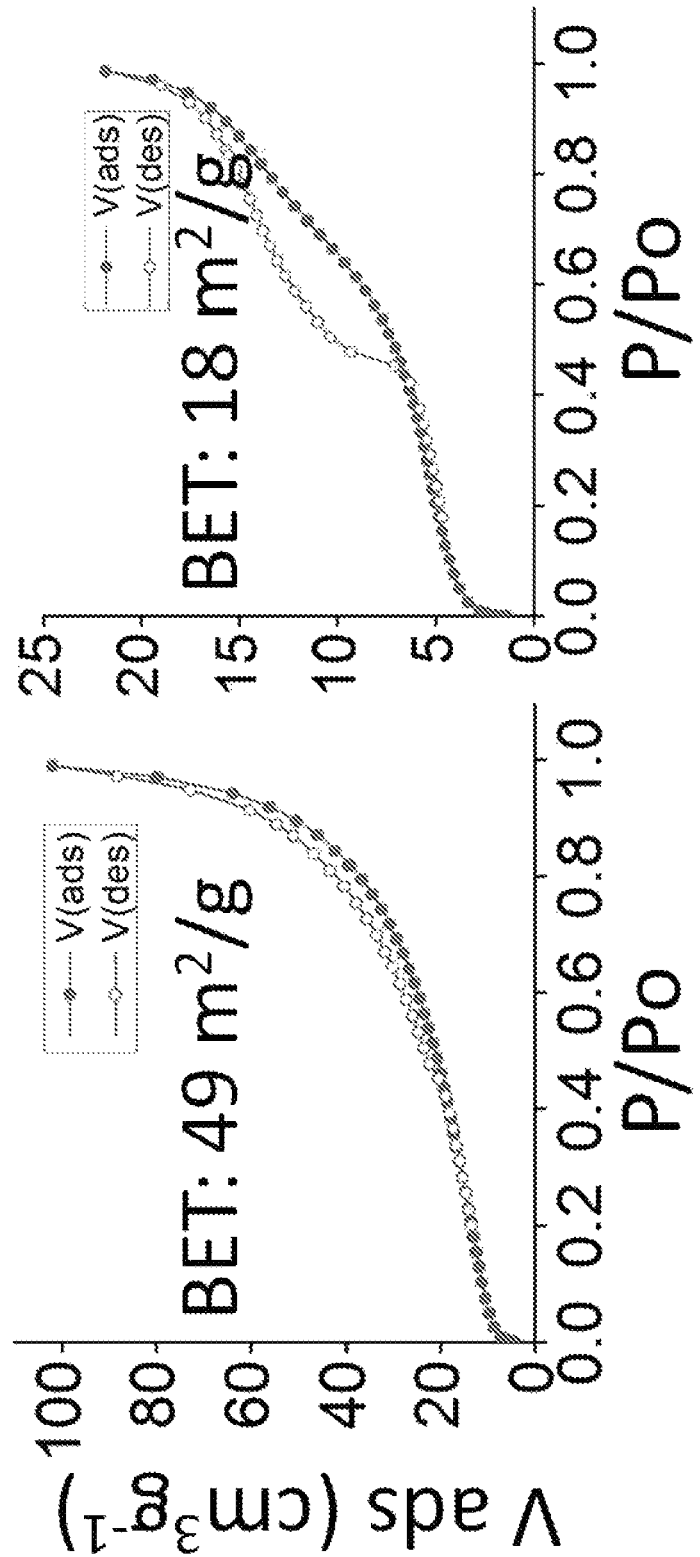
FIG. 5A shows the nitrogen adsorption/desorption isotherms for porous $Cs_{2-x}K_xSnSb_2S_6$.
FIG. 5B shows the nitrogen adsorption/desorption isotherms for porous $Na_{2-x}K_xSnSb_2S_6$.
Figure 5C:
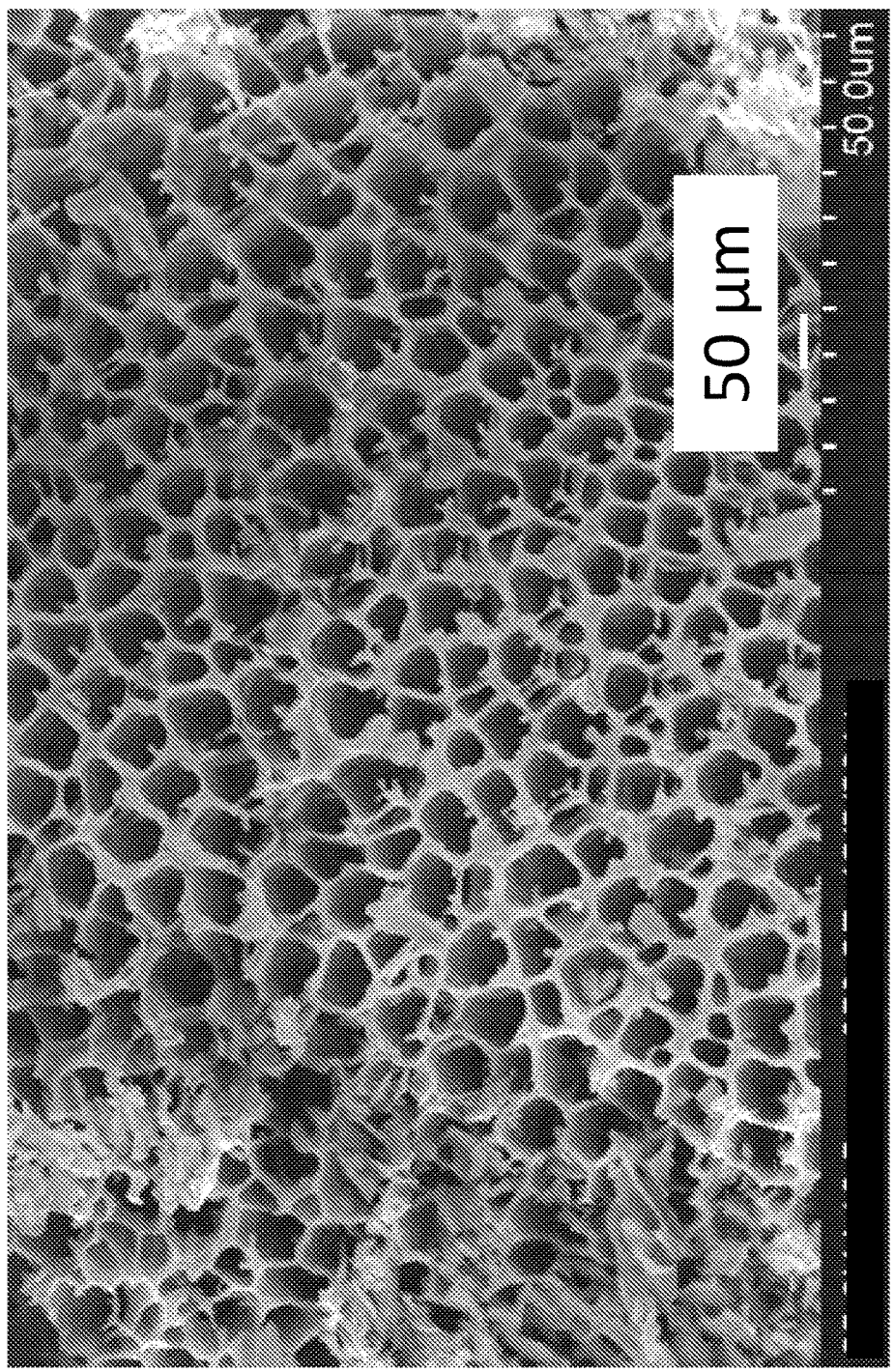
FIG. 5C is an SEM image porous $Cs_{2-x}K_xSnSb_2S_6$.
Figure 5D:
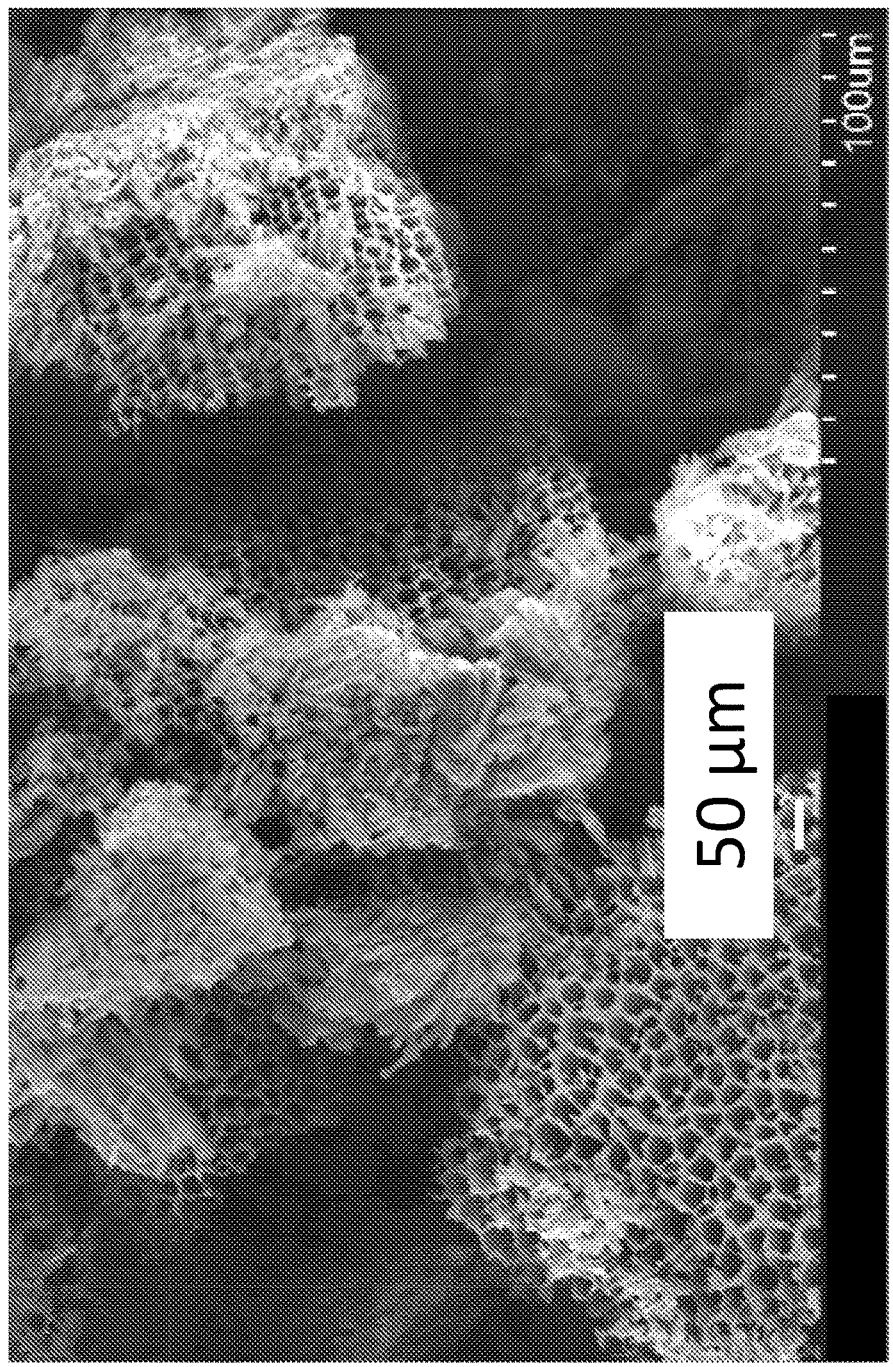
FIG. 5D is an SEM image of porous $Na_{2-x}K_xSnSb_2S_6$.

The porous samples can form using various inert but soluble inorganic salts such as NaCl, NaI, KCl, and KI with different volume ratios to the chalcogenides. The critical condition for this process is to obtain a homogeneous melt of the chalcogenides and inorganic halide salts followed by rapid cooling to solidification. The latter creates rapid phase separation because the inorganic salts are immiscible in the solid state with the chalcogenides thus forming an interpenetrated 2-phase composite. Best results in terms of porosity were obtained for mixtures of Cs$_2$SnSb$_2$S$_6$+KI (1:5 vol. %) and for K$_2$SnSb$_2$S$_6$+ NaI (1:2 vol. %). This procedure led to the formation of Cs$_{2-x}$K$_x$SnSb$_2$S$_6$ and Na$_{2-x}$K$_x$SnSb$_2$S$_6$ phases, respectively, which were confirmed by EDS and XPS. The Sb 3d peaks (~529, 538 eV) and Sn 3d peaks (~486, 494 eV) in XPS confirmed the Sb$^{3+}$ and Sn$^{4+}$ oxidation states both in the amorphous and their porous versions. SEM images showed that the porous chalcogenides exhibit pores with a diameter ranging from several hundred nanometers to one hundred microns, or even larger. FIG. 5C is an SEM image porous Cs$_{2-x}$K$_x$SnSb$_2$S$_6$. FIG. 5D is an SEM image of porous Na$_{2-x}$K$_x$SnSb$_2$S$_6$. The pore wall thicknesses vary from ~100 to 300 nm. However, N$_2$ sorption isotherms at 77K show mesoporosity as well, with a wide pore size distribution between 2 to 18 nm. FIG. 5A shows the nitrogen adsorption/desorption isotherms for porous Cs$_{2-x}$K$_x$SnSb$_2$S$_6$. FIG. 5B shows the nitrogen adsorption/desorption isotherms for porous Na$_{2-x}$K$_x$SnSb$_2$S$_6$. Both porous phases show a type 2 isotherm (with a hysteresis loop in the case of Na$_{2-x}$K$_x$SnSb$_2$S$_6$) with a maximum uptake of 102.1 cm$^3$/g for Cs$_{2-x}$K$_x$SnSb$_2$S$_6$ and 21.8 cm$^3$/g for Na$_{2-x}$K$_x$SnSb$_2$S$_6$. The associated BET surface areas are 49 m$^2$/g for Cs$_{2-x}$K$_x$SnSb$_2$S$_6$ and 18 m$^2$/g for Na$_{2-x}$K$_x$SnSb$_2$S$_6$.

It is remarkable that the porous version of compound 1 was stable in water with pH ranging from 0 to 12. (The required pHs (2, 4, 6, 8, 10 and 12) were achieved by diluting the commercial standards (1000 ppm) with HCl or NaOH solution to 6 ppm.) At low pH the materials undergo proton exchange to form (H$_3$O)$^+$ derivatives which can be converted to H$_2$SnSb$_2$S$_6$ upon heating to remove the water, Eq. (4,5). The S—H stretching vibration is then observed at 2430 cm$^{-1}$. Consistent with the partial substitution of the alkali ions by hydronium ions, (H$_3$O)$^+$ EDS analysis of the materials confirmed that in an acidic solution, the fraction of the alkali metals was significantly reduced compared to the pristine porous chalcogenides. The ion exchange caused a red shift in the electronic absorption edge of the material, in a similar fashion observed previously in the K$_2$MnSn$_2$S$_6$ (Manos, M. J.; Petkov, V. G.; Kanatzidis, M. G., H$_{2x}$Mn$_x$Sn$_{3-x}$S$_6$ (x=0.11-0.25): A Novel Reusable Sorbent for Highly Specific Mercury Capture Under Extreme pH Conditions. *Adv. Funct. Mater.* 2009, 19, 1087, 13, 51) and (NH$_4$)$_4$In$_{12}$Se$_{20}$ materials (Manos, M. J.; Malliakas, C. D.; Kanatzidis, M. G., Heavy-Metal-Ion Capture, Ion-Exchange, and Exceptional Acid Stability of the Open-Framework Chalcogenide (NH$_4$)$_4$In$_{12}$Se$_{20}$. *Chem. Eur. J.* 2007).

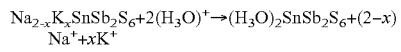

Na$_{2-x}$K$_x$SnSb$_2$S$_6$+2(H$_3$O)$^+$→(H$_3$O)$_2$SnSb$_2$S$_6$+(2-x)Na$^+$+xK$^+$   Eq. 4

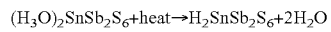

(H$_3$O)$_2$SnSb$_2$S$_6$+heat→H$_2$SnSb$_2$S$_6$+2H$_2$O   Eq. 5

To evaluate the ability of the porous versions of the amorphous chalcogenides, 1 and 2, to remove heavy metal ions from aqueous solutions, ion-exchange experiments were performed using the batch method. A typical ion exchange experiment of porous glass with Pb$^{2+}$, Hg$^{2+}$, or Cd$^{2+}$ was as follows: In a 20 mL scintillation vial, measured amounts of appropriate salts (0.1 mmol) were dissolved in water (10 mL) and the glass compound (0.1 mmol) was added. The mixture was kept under magnetic stirring for 12-15 h. Then, the glass material was centrifuged and isolated by filtration, washed several times with water and acetone, and dried under vacuum. The initial and final concentrations of the metal ions in solutions were determined by ICP-MS. The distribution coefficient, K$_d$, used for the determination of the affinity and selectivity of porous amorphous chalcogenides for Pb$^{2+}$, Hg$^{2+}$, and Cd$^{2+}$ is given by the equation: K$_d$=(V/m)[(C$_0$-C$_f$)/C$_f$] where C$_0$ and C$_f$ are the initial and equilibrium concentration of a given ion (ppm), V is the volume (mL) of the testing solution, and m is the amount of the ion exchanger (g) used in the experiment. The initial and final concentrations of the metal ions were determined by Inductively Coupled Plasma-Mass Spectrometry (ICP-MS), which is capable of identifying elements at ppt-ppb levels. At a molar ratio of M$^{2+}$:Na$_{2-x}$K$_x$SnSb$_2$S$_6$ 1:1, ~73% of Pb$^{2+}$, ~84% of Cd$^{2+}$ and 99.99% of Hg$^{2+}$ ions were removed with enormous distribution coefficient values, K$_d$ for Hg$^{2+}$ is 7.2×10$^8$. Cs$_{2-x}$K$_x$SnSb$_2$S$_6$ showed higher percent removal for Pb$^{2+}$ (~84%), Cd$^{2+}$ (~90%), and the same 99.99% of Hg$^{2+}$ removal with high distribution coefficient values, K$_d$ (6.8× 10$^7$). Selected results are presented in Table 1. The K$_d$ values of Hg$^{2+}$ removal by porous Na$_{2-x}$K$_x$SnSb$_2$S$_6$ and Cs$_{2-x}$K$_x$SnSb$_2$S$_6$ are much higher than the previously reported values for crystalline A$_{2x}$M$_x$Sn$_{3-x}$S$_6$ (A=alkali metal; M=Mn, Mg; x=0.5-0.95; KMS-1 and KMS-2, respectively) (Manos, M. J.; Kanatzidis, M. G., Sequestration of Heavy Metals from Water with Layered Metal Sulfides. *Chem. Eur. J.* 2009, 15, 4779; Mertz, J. L. PhD thesis, Synthesis and ion-exchange of framework and layered chalcogenide compounds for environmental remediation. Northwestern University, 2012). The best K$_d$ values observed for KMS-1 and KMS-2 were 3.5×10$^4$ and 5.35×10$^4$, respectively.

TABLE 1

Selected data for Pb$^{2+}$, Hg$^{2+}$, Cd$^{2+}$ ion-exchange experiments using porous glasses (PGs) of 1 and 2.

| PGs | V/m mL/g | [conc.]$_o$ ppm | [conc.]$_f$ ppm | % removal | K$_d$ mL/g |
|---|---|---|---|---|---|
| 1 | 952.4(Pb) | 641.4(Pb) | 175.4(Pb) | 72.6(Pb) | 2.5 × 10$^3$(Pb) |
|   | 943.4(Hg) | 541.0(Hg) | 0.000(Hg) | 99.9(Hg) | 7.2 × 10$^8$(Hg) |
|   | 961.5(Cd) | 329.5(Cd) | 53.5(Cd) | 83.8(Cd) | 4.9 × 10$^3$(Cd) |
| 2 | 892.9(Pb) | 641.7(Pb) | 102.5(Pb) | 84.0(Pb) | 4.7 × 10$^3$(Pb) |
|   | 884.9(Hg) | 541.0(Hg) | 0.007(Hg) | 99.9(Hg) | 6.8 × 10$^7$(Hg) |
|   | 884.9(Cd) | 342.5(Cd) | 34.3(Cd) | 89.9(Cd) | 7.9 × 10$^3$(Cd) | a. reaction time: 15 h; room temperature.
b. samples were prepared in triplicate and the average is reported here.

Figure 6:
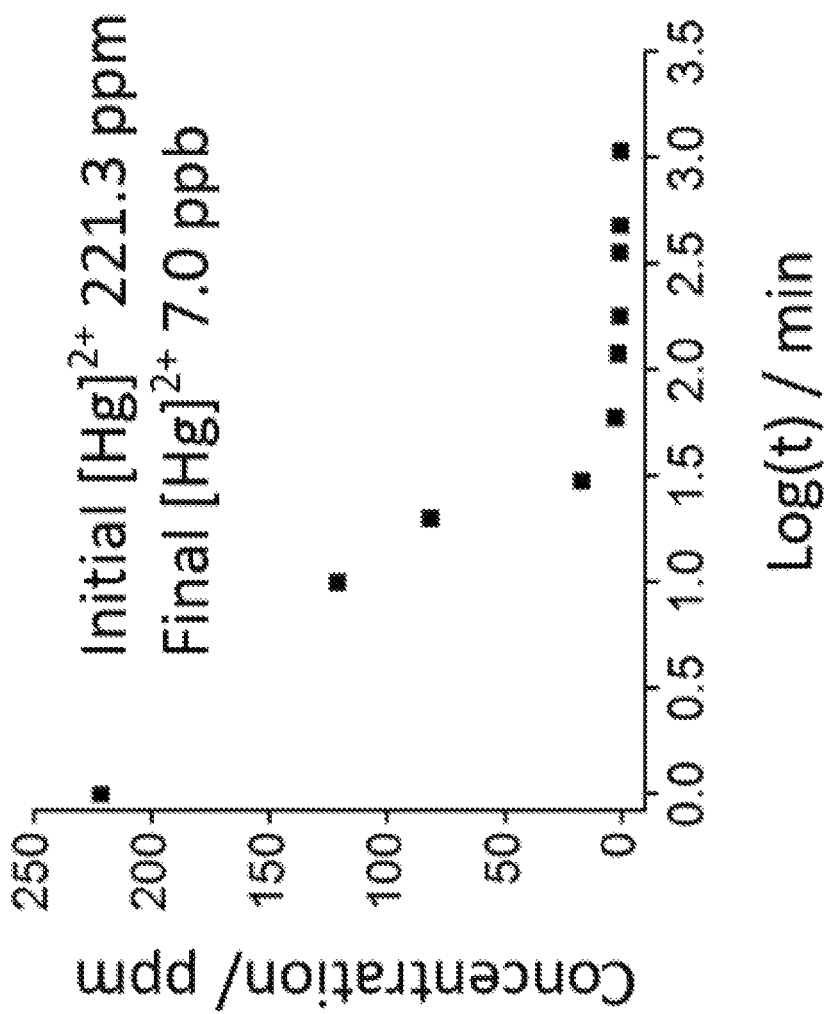
FIG. 6 shows the kinetics for adsorbing $Hg^{2+}$ from an aqueous solution by a porous metal chalcogenide.

To better understand the ion exchange behavior of porous Na$_{2-x}$K$_x$SnSb$_2$S$_6$, the kinetics of the Hg$^{2+}$ ion-exchange was investigated using the batch method (pH=7, V/m~1000 mL/g). The maximum initial concentrations of the ions used were just high enough to saturate the exchanged sites of Na$_{2-x}$K$_x$SnSb$_2$S$_6$. Within ~2 h of solution/Na$_{2-x}$K$_x$SnSb$_2$S$_6$ contact, Hg$^{2+}$ exchange reached its equilibrium with more than 99.5% of its initial amounts removed from solution (FIG. 6). The high affinity of the soft Lewis basic framework for soft Lewis acids is the driving force for the fast $Hg^{2+}$ removal.

In conclusion, the amorphous chalcogenides $K_{2x}Sn_xSb_{3-x}S_6$, $Cs_{2x}Sn_xSb_{3-x}S_6$, and $K_{2x}Sn_xSb_{3-x}Se_6$ (x=0.8-1; 1, 2, 3 respectively) are stable and have no crystalline counterparts. The previously reported crystalline $A_2Sb_2Sn_3S_{10}$ (A=K, Rb, Cs) have not been observed in this work (Yohannan, J. P.; Vidyasagar K., Syntheses and characterization of one-dimensional alkali metal antimony(III) thiostannates(IV), $A_2Sb_2Sn_3S_{10}$ (A=K, Rb, Cs). *J. Solid State Chem.* 2015, 221, 42). However, it is possible that the two families of materials share structural features. By flame melting mixtures of pre-synthesized amorphous sulfides of compounds 1 and 2 and soluble inorganic salts, followed by water quenching and exsolution of the salts, porous materials can be prepared which exhibit porosity at all length scales including micro-porosity. These materials are effective in the selective adsorption of $Pb^{2+}$, $Cd^{2+}$, and $Hg^{2+}$ metal ions from their solutions. The strong tendency of S atoms to bind with heavy metal ions act as a driving force.

Characterization Methods

Powder X-ray Diffraction (PXRD). The samples were examined by PXRD for identification purposes and to assess phase purity. Powder patterns were obtained by using a CPS 120 INEL X-ray powder diffractometer with a graphite monochromated Cu Kα radiation operating at 40 kV and 20 mA. Samples were ground and spread on a glass slide.

Raman Spectroscopy. The DeltaNu Raman system with a 785 nm CW laser and a spectral range from ~200 to 2000 $cm^{-1}$ was used. Samples were loaded in capillary tubes. The 785 nm laser was chosen as a compromise between optimizing sensitivity and avoiding fluorescence, which overwhelms the Raman system.

Elemental Analysis. Powders were imaged by a scanning electron microscope (SEM) and the relative atomic composition was determined with energy dispersive spectroscopy (EDS). A Hitachi S-3400N-II system was used with 25.0 kV acceleration voltages, a 60 s acquisition time and the ESED II detector for elemental analysis. Carbon and oxygen content from EDS data were excluded from the calculation of relative elemental composition ratios for accuracy.

X-ray Photoelectron Spectroscopy (XPS). X-ray photoelectron studies were performed using a Thermo Fisher Scientific ESCALAB 250 Xi spectrometer equipped with a monochromatic Al Kα X-ray source (1486.6 eV) and operated at 300 W. Samples were analyzed under vacuum ($P<10^{-8}$ mbar), whereas survey scans and high-resolution scans were collected using pass energy of 50 eV. Binding energies were referred to the C 1s binding energy at 284.6 eV. A low-energy electron flood gun was employed for charge neutralization. Prior to XPS measurements, powders of amorphous and porous amorphous chalcogenides were attached on copper foil, mounted on stubs, and successively put into the entry-load chamber to pump.

Differential Thermal Analysis (DTA). DTA experiments were performed on Shimadzu DTA-50 thermal analyzer. Typically, a sample (~40 mg) of ground material was sealed in a quartz ampoule under vacuum. A similar ampoule of equal mass filled with $Al_2O_3$ was sealed and placed on the reference side of the detector. The heating rate was 10° C. $min^{-1}$ under a 30 ml $min^{-1}$ flow of $N_2$.

Band Gap Measurements. UV/vis/near-IR diffuse reflectance spectra were obtained at room temperature on a Shimadzu UV-3010 PC double beam, double monochromator spectrophotometer in the wavelength range of 200-2500 nm. $BaSO_4$ powder was used as a reference (100% reflectance) and base material on which the powder sample was coated. The reflectance data were converted to absorption using the Kubelka-Munck function, and the band edge for each sample was estimated from the intercept of the line extrapolated from the high-energy end of the absorption to the baseline.

Inductively Coupled Plasma-Mass Spectroscopy [ICP-MS] Analyses. Accurate determination of $Hg^{2+}$, $Pb^{2+}$ and $Cd^{2+}$ in solutions after ion-exchange was performed by ICP-MS. Quadrupole ICP-MS is capable of identifying elements from ppt-ppb levels. To accurately determine the amount of $Hg^{2+}$, $Pb^{2+}$ and $Cd^{2+}$, a computer-controlled Thermo Elemental (Waltham, Mass.) PQ ExCell Inductively Coupled Plasma Mass Spectrometer (ICP-MS) with a quadrupole setup was used. Isotopes $^{199}Hg$, $^{200}Hg$, $^{202}Hg$, $^{206}Pb$, $^{207}Pb$, $^{111}Cd$ were analyzed. Nine standards of $Hg^{2+}$, $Pb^{2+}$ and $Cd^{2+}$ in the range of 1-40 ppb were prepared by diluting commercial (Aldrich or GFS chemicals) 1000 ppm solutions. To accurately measure the extremely low level of (<1 ppb) $Hg^{2+}$, $Pb^{2+}$, $Cd^{2+}$ concentrations of some solutions, seven standards in the range 0.1-2 ppb were prepared and used for the determination of the $Hg^{2+}$, $Pb^{2+}$ and $Cd^{2+}$ content of these solutions. All samples (including standards and a blank solution) were prepared in a 3% nitric acid solution with 1 ppb $^{153}Eu$ internal standard in order to correct for instrumental drift and matrix effects during analysis (Moens, L.; Dams, R., NAA and ICP-MS: A comparison between two methods for trace and ultra-trace element analysis. *J. Radioanal. Nucl. Chem.* 1995, 192, 29-38). To help stabilize $Hg^{2+}$ in solution and avoid contamination of the plasma by trace mercury amounts, solution of Au (with ~10 times higher in concentration than Hg) was added to the standards and the $Hg^{2+}$-containing samples (Gerlach, R. W.; Gustin, M. S.; Emon, J. M. V., On-Site Mercury Analysis of Soil at Hazardous Waste Sites by Immunoassay and ASV. *Appl. Geochem.* 2001, 16, 281-290; Fatemian, E.; Allibone, J.; Walker, P. J., Use of gold as a routine and long term preservative for mercury in potable water, as determined by ICP-MS. *The Analyst* 1999, 124, 1233-1236).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An amorphous metal chalcogenide having the formula $A_{2x}Sn_xSb_{3-x}Q_6$, wherein x is in the range from 0.8 to 1, A is an alkali metal element, and Q is S or Se.

2. The amorphous metal chalcogenide of claim 1, wherein Q is S.

3. The amorphous metal chalcogenide of claim 1, wherein A is K or Cs.

4. The amorphous metal chalcogenide of claim 1, wherein the metal chalcogenide has the formula $K_{2x}Sn_xSb_{3-x}S_6$, $Cs_{2x}Sn_xSb_{3-x}S_6$, or $K_{2x}Sn_xSb_{3-x}Se_6$.

5. A porous material comprising a chalcogenide having the formula $A_xM_yM'_zQ_m$, where A is an alkali metal element or a mixture of two or more alkali metal elements; M and M' are main group metal elements or elements from groups 14 or 15 of the periodic table of the elements; Q is S, Se or Te; x', y, and z are independently selected from values in the range from 0 to 10, and m is in the range from 1 to 20, wherein the material includes pores having pore sizes in the range from 200 nm to 10 μm.

6. The porous material of claim 5, wherein the material includes pores having sizes of at least 10 μm.

7. The porous material of claim 5, wherein the material includes pores having sizes of at least 100 μm.

8. The porous material of claim 5, wherein M is Sn and M' is Sb.

9. The material of claim 5, wherein the chalcogenide has the formula $(AB)_{2x}Sn_xSb_{3-x}Q_6$, wherein x is in the range from 0.8 to 1, A and B are two different alkali metal elements, and Q is S or Se.

10. The material of claim 9, wherein Q is S.

11. The material of claim 10, wherein A is K or Cs and B is Li, Na, or K.

12. The material of claim 9, wherein the chalcogenide has the formula $Cs_{2-x}K_xSn_xSb_{3-x}S_6$ or $Na_{2-x}K_xSn_xSb_{3-x}S_6$.

13. The material of claim 12, wherein the chalcogenide has the formula $CsKSnSb_2S_6$ or $NaKSnSb_2S_6$.

14. A method of removing metal ions from a sample, the method comprising:
exposing a liquid- or vapor-phase sample comprising metal ions or metal vapors to the porous material of claim 5, whereby the metal ions undergo ion exchange with the chalcogenide; and
removing the porous material from the sample.

15. The method of claim 14, wherein the metal ions are transition metal ions.

16. The method of claim 14, wherein the metal ions are radioactive.

17. The method of claim 14, wherein the sample comprises waste water from a nuclear power plant, waste water from a municipal water treatment plant, water from a municipal drinking water source, or water from a natural body of water.

18. The method of claim 14, wherein the metal ion is $Hg^{2+}$, $Ag^+$, $Co^{2+}$, $Pb^{2+}$, or $Cd^{2+}$.

19. A method of making the porous chalcogenide, the method comprising:
mixing an amorphous metal chalcogenide having the formula $A_xM_yM'_zQ_m$, where A is an alkali metal element; M and M' are main group metal elements or elements from groups 14 or 15 of the periodic table of the elements; Q is S, Se or Te; x', y, and z are independently selected from values in the range from 0 to 10, and m is in the range from 1 to 20, with an inorganic halide salt having the formula BX, where X is a halogen and B is an alkali metal element, and further wherein A and B may be the same element or different elements;
melting the amorphous metal chalcogenide and the inorganic halide salt to form a homogeneous molten mixture;
solidifying the molten mixture to form a composite material comprising particles of a first phase comprising the inorganic halide salt in a matrix of a second phase comprising the amorphous metal chalcogenide having the formula $A_xM_yM'_zQ_m$; and
extracting the first phase from the composite material.

20. A method of making the porous chalcogenide, the method comprising:
mixing an amorphous metal chalcogenide having the formula $A_{2x}Sn_xSb_{3-x}Q_6$, wherein x is in the range from 0.8 to 1, A is an alkali metal element, and Q is S or Se, with an inorganic halide salt having the formula BX, where X is a halogen and B is an alkali metal element;
melting the amorphous metal chalcogenide and the inorganic halide salt to form a homogeneous molten mixture;
solidifying the molten mixture to form a composite material comprising particles of a first phase comprising the inorganic halide salt in a matrix of a second phase comprising the amorphous metal chalcogenide of claim 1; and
extracting the first phase from the composite material.

21. The method of claim 20, wherein the metal chalcogenide has the formula $A_{2x}Sn_xSb_{3-x}Q_6$, wherein x is in the range from 0.8 to 1, A is K or Cs and Q is S or Se; the inorganic halide salt is a lithium halide salt, sodium halide salt, or a potassium halide salt; and the porous material comprises a chalcogenide having the formula $(AB)_{2x}Sn_xSb_{3-x}Q_6$, wherein x is in the range from 0.8 to 1, B is Li, Na, or K.

* * * * *